United States Patent [19]
O'Driscoll et al.

[11] Patent Number: 5,813,695
[45] Date of Patent: Sep. 29, 1998

[54] IGNITER POST FOR AIRBAG GAS GENERATOR

[75] Inventors: Peter O'Driscoll, Los Altos; Glenn Sander, San Jose, both of Calif.

[73] Assignee: United Technologies Corporation, Hartford, Conn.

[21] Appl. No.: 718,067

[22] Filed: Sep. 17, 1996

[51] Int. Cl.⁶ .................................................. B60R 21/26
[52] U.S. Cl. .......................................... 280/741; 280/736
[58] Field of Search .................................. 280/741, 736; 222/3; 102/530, 531, 202, 202.14; 422/165

[56] References Cited

U.S. PATENT DOCUMENTS

| | | | |
|---|---|---|---|
| 4,902,036 | 2/1990 | Zander et al. | 280/736 |
| 5,224,734 | 7/1993 | Swiderski | 280/741 |
| 5,316,749 | 5/1994 | Schmitt et al. | 423/385 |
| 5,324,075 | 6/1994 | Sampson | 280/736 |
| 5,340,150 | 8/1994 | Harada et al. | 280/741 X |
| 5,482,316 | 1/1996 | Lang et al. | 280/741 |
| 5,489,118 | 2/1996 | Carothers et al. | 280/741 |
| 5,503,426 | 4/1996 | Lang et al. | 280/741 X |
| 5,613,706 | 3/1997 | Parker et al. | 280/741 |

*Primary Examiner*—Christopher P. Ellis
*Attorney, Agent, or Firm*—McAulay Fisher Nissen Goldberg & Kiel, LLP

[57] ABSTRACT

A gas generator assembly has an igniter post having a substantially tubular body. The body has a plurality of holes passing from the interior to the exterior of the body for igniting. A preformed head on one end of the body has a diameter larger than that of the body. A transverse wall closes off the tubular body opposite the head end. A ductile rim having a diameter comparable to the body diameter, is extendable through an opening in the combustion chamber wall after pellet loading the rim is flared outwardly to lock the post to the assembly, and thereby form an additional head on the igniter post.

14 Claims, 6 Drawing Sheets

IGNITER POST FOR AIRBAG GAS GENERATOR

BACKGROUND OF THE INVENTION

This invention relates to a pyrotechnic gas generator and more particularly, to a press-formed igniter post for use in an airbag gas generator.

Pyrotechnic gas generators are widely employed in automobile passive restraint devices, more commonly known as "airbags". A typical gas generator is an annular dome shaped device including a toroidal combustion chamber loaded with pyrotechnic pellets which are capable of rapidly and forcefully generating gas during combustion. A cylindrical igniter post traverses the center of the generator, acting both to ignite the pyrotechnic pellets and to brace the opposite faces of the gas generator to prevent bursting or separation of the faces during combustion. Assembly of such a device is complicated, as any heat or shock applied to the inflator once the pellets have been loaded risks ignition.

For the igniter post to successfully prevent bursting or separation of the gas generator, the post must have structural heads on each end. Typically, the post has one integrally formed head at one end and a second head screwed to its other end after insertion of an initiator into a hollowed center portion of the post to complete the assembly However, the use of threaded components is costly and results in a less compact gas generator. In addition, the screwing together of threaded components is hazardous if any pyrotechnic material is trapped between the threads. Another approach has been to weld the second head after pellet loading, though this also poses the potential for unwanted ignition.

SUMMARY OF THE INVENTION

Accordingly, it is an object of the present invention to provide a method of manufacturing a pyrotechnic gas generator where levels of heat and shock applied to the generator are limited after loading of pyrotechnic pellets.

It is a further object of the present invention to provide a pyrotechnic gas generator having an igniter post which is not welded or threaded during assembly.

These and other objects of the present invention are achieved by an igniter post comprising a substantially tubular body, the body having a plurality of holes passing from a hollow interior of the body to an exterior of the body. The body has a head on a first end thereof, having a diameter larger than an outside diameter of the body. The body has a ductile extendable rim at a second end opposite the first end, the ductile rim having a diameter comparable to the diameter of the body but being cold-formable to extend outwardly to have a diameter larger than the outside diameter of the body after incorporation in a gas generator.

A method of assembling a gas generator in accordance with the present invention comprises providing a combustion chamber having a first wall and a second wall on opposite exterior sides thereof; providing a first opening in the first wall and a second opening in the second wall, the openings being coaxially aligned; providing an igniter post having a tubular body sized for incorporation within the openings, the body having a head at one end of the body which is larger in diameter than the first opening, and having a ductile extendable rim at the opposite end of the body, the rim having an initial diameter comparable to the tubular body size; inserting the body through the first opening, until the head abuts the first wall and the rim passes through the second opening; and, bending the ductile rim such that it extends outwardly over the second wall.

Preferably, after insertion but before the head contacts the first wall, a gas generating fuel is placed in the combustion chamber through the second opening. Once loaded, the insertion step is completed and the rim bent to complete the assembly.

A cold forming process is used to flare the rim. For example, a die having a conical surface may be pressed against an interior surface of the rim to cause it to expand outwardly. Optionally, a mandrel can be inserted into the hollow interior of the igniter post to support the igniter post during forming. Also, to increase the strength of the cold formed joint, a washer with a beveled interior surface can be fitted around the rim prior to forming.

A gas generator according to the present invention comprises a casing having a combustion chamber. The casing has a first side with a first opening and a second side with a second opening. An igniter post traverses the casing from the first opening to the second opening. The igniter post has a substantially tubular body with a plurality of holes extending from a hollow interior of the body to the combustion chamber. A head on a first end of the igniter post engages the first side of the casing. A transverse wall closes off the tubular body at a second end of the body opposite the first end. A ductile extendable rim on the second end of the body is then press-formed to engage the second side of the casing, thus locking the post in position.

DETAILED DESCRIPTION OF THE INVENTION

Figure 1:
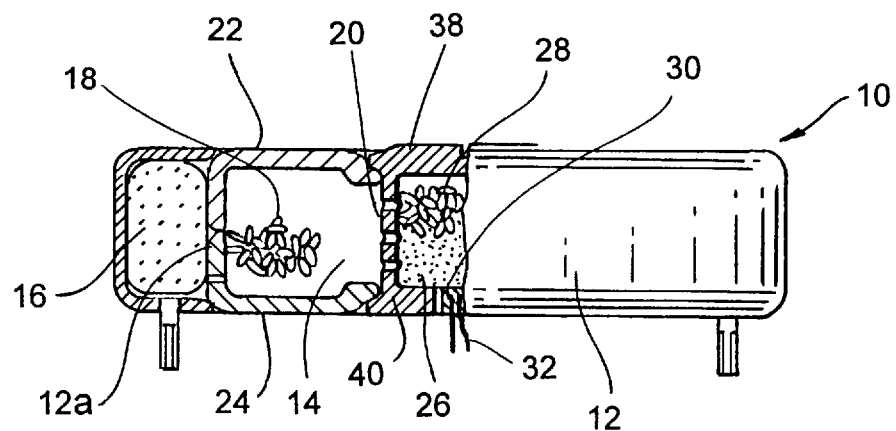
FIG. 1 is a partial cross-sectional view of a pyrotechnic gas generator in accordance with the present invention.
Figure 2:
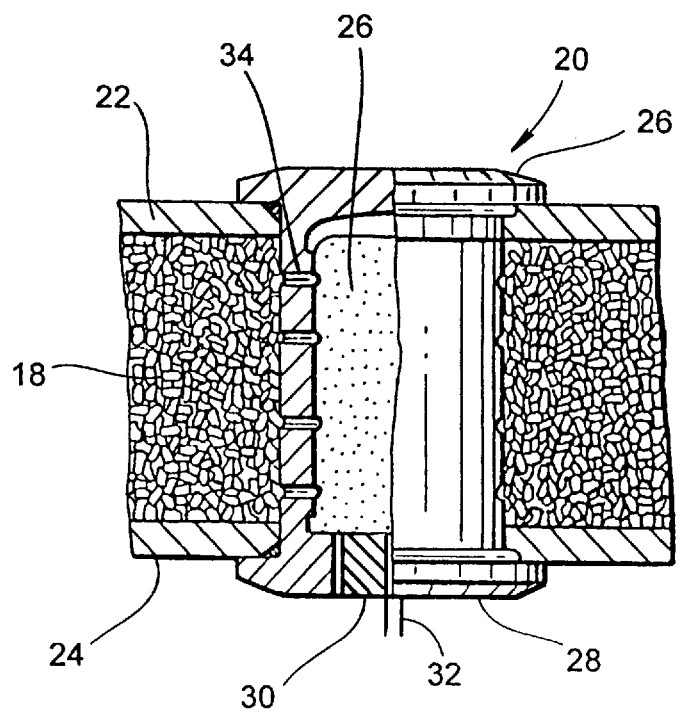
FIG. 2 is a partial cross-sectional view of an igniter post in a gas generator in accordance with the present invention.

Referring to FIGS. 1 and 2, a gas generator 10 has a casing 12 enclosing a combustion chamber 14 and a filtration chamber 16. The combustion chamber 14 is filled with pyrotechnic pellets 18. An igniter post 20 is positioned in the gas generator 10 and extends between a first side 22 and a second side 24 of the casing 12 which has a chamber wall 12a. An igniter bag 26 containing an initiator 28 is located inside a hollow area in the igniter post 20. A squib 30 has electrical leads 32 to provide ignition of the bag 26 in response to an electrical signal. Once the bag is ignited, combustion of the pellets is initiated through holes 34 in post 20, the pellets 18 combusting to generate a gas which then passes through the filtration chamber 16 to an airbag (not shown).

During combustion of the pellets 18, gas pressure tends to force the sides 22 and 24 to bulge outwards. The igniter post 20, being centrally located in the gas generator, acts as a structural member to reinforce the first and second sides to resist this outward expansion. To do this, the igniter post has two heads 38 and 40 which act as a structural tie between the sides 22 and 24, and together with the chamber wall 12a, thereby prevent deformation. The provision of these heads will be discussed hereafter.

Figure 3:
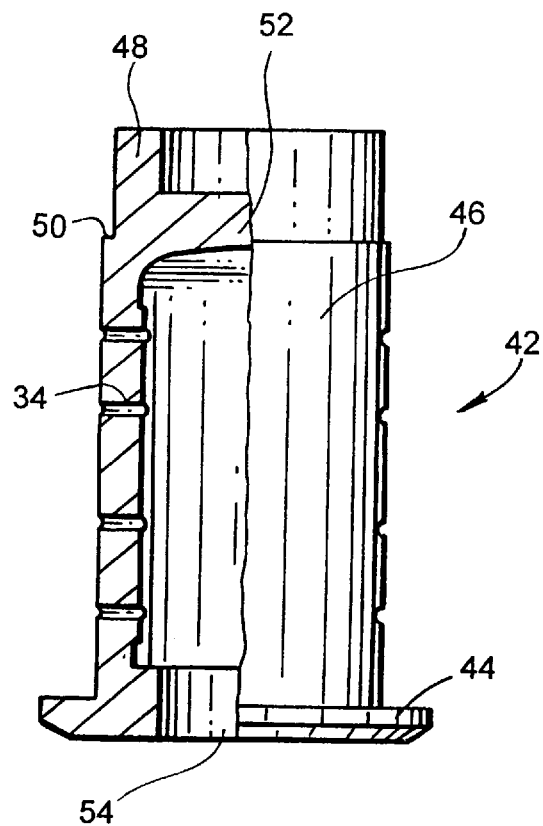
FIG. 3 is a partial cross-sectional view of an igniter post in accordance with the present invention.

Referring to FIG. 3, an igniter post 42 has a preformed head 44 at one end of a hollow tubular body 46 and a rim 48 at the opposite end of the body 44. The head 44 has an outside diameter larger than the outside diameter of body 46, and the outside diameter of rim 48 is the same or preferably less than the outside diameter of body 46. In this embodiment, the rim has a smaller diameter than the body diameter, thus forming a ridge 50. A transverse wall 52 closes off the end of the igniter post adjacent the rim 48. The head 44 has an opening 54 for the insertion of the igniter bag 26, the opening then sealed by the squib 30.

While the invention is described relative to having the squib opening at the preformed end, it is equally possible to include the squib opening in the end with the ductile rim, in which case the transverse wall would be in the preformed end. The invention is thus not limited in view of these features.

Various materials may be used to produce the igniter post, though it is important that the material in the rim be suitably ductile for cold forming, yet be of sufficient strength, after forming to retain the first and second sides in place during combustion. Preferred materials for the construction of the igniter post include many metals and alloys, preferably those having a rating of about 180 KSI, with steel and 4000 series alloy steel preferred. The particular material chosen should be ductile and have a high shear strength.

Figure 4A:
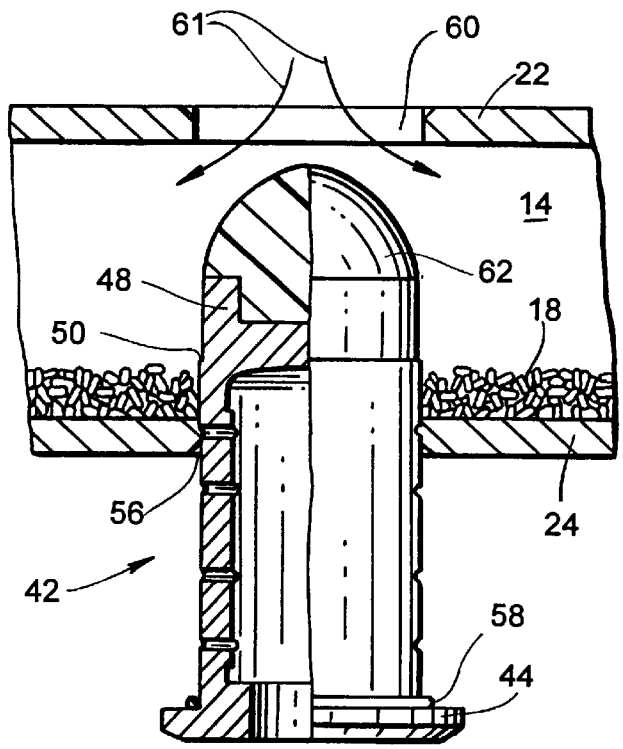
FIGS. 4A–D are partial cross-sectional views of an igniter post illustrating steps in the assembly of a gas generator in accordance with the present invention.

Referring to FIG. 4A, the post 42 is partially inserted through an opening 56 in the side 24. A gasket or O-ring seal 58 may be provided to prevent gas bypass. Once the post 42 is partially inserted into the opening 56, pellets 18 are introduced into the combustion chamber 14 through an opening 60 in the side 22 as indicated by arrows 61. A removable cap 62 which may be made of plastic is placed over the rim 48 to prevent the pellets 18 from being caught in the rim 48.

Figure 4B:
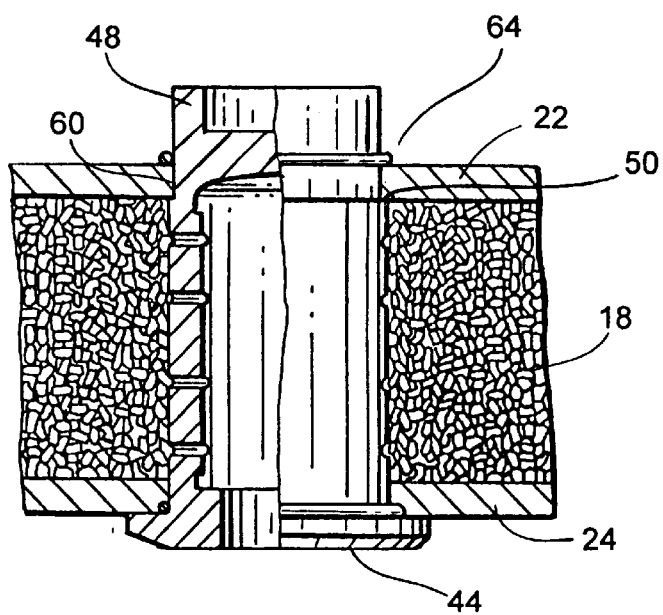

Referring to FIG. 4B, after the combustion chamber 14 is filled with pellets 18, the post 42 is inserted completely through the opening 56 so that the head 44 abuts against the first side 24 and the rim 48 extends through the opening 60. At this point, the ridge 50 engages the side 22. A gasket or O-ring 64 is then optionally placed around the rim 48, again for sealing against gas bypass and the cap 62 is removed.

Figure 4C:
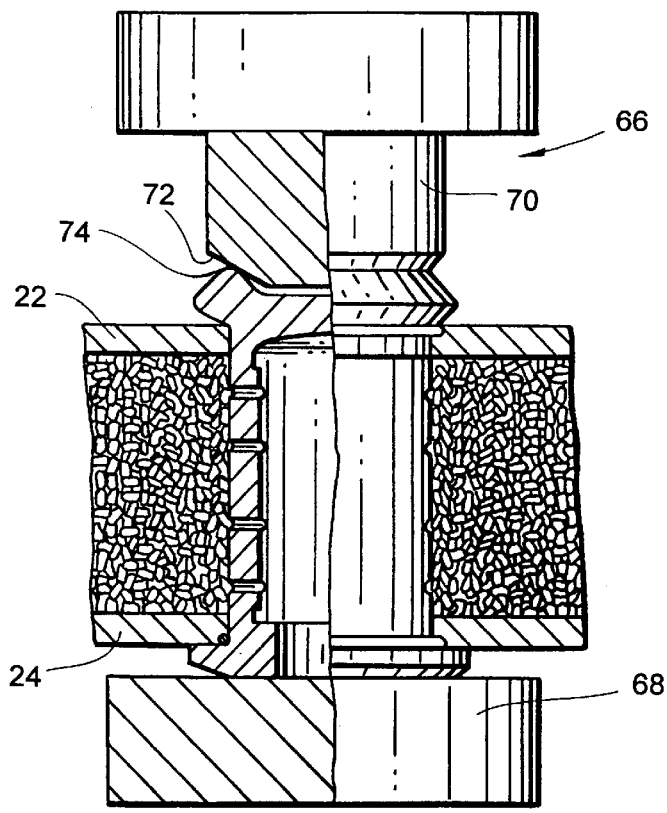
Figure 4D:
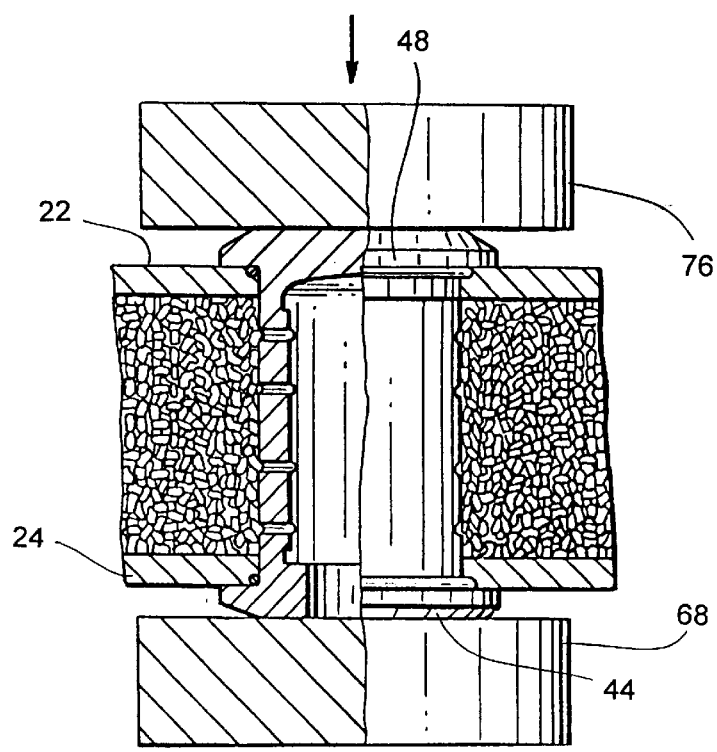

Referring to FIG. 4C, the assembly is placed in a press-forming tool 66, which is preferably a hydraulic press, though a riveting machine or another pressing or cold-forming tool could be used. The press-forming tool 66 has a stationary base 68 and a movable die 70 with a conical surface 72. The igniter post 42 is pressed between the base 68 and the die 70 such that the conical surface 72 of die 70 engages an inside edge 74 of the rim 48, to flare the rim 48 in an outward direction. Subsequently, a second movable die 76 (FIG. 4D) is pressed against the rim until it is flattened against the side 22, though the rim 48 need not be pressed entirely flush against side 22. Once formed, the rim 48 serves as a head which together with the head 44 acts as a structural tie to prevent deformation of the sides 22 and 24 during combustion.

Even if some splitting of rim 48 occurs during die pressing, the rim 48 has a shear strength sufficient to withstand shearing forces adjacent the opening 60.

Figure 5A:
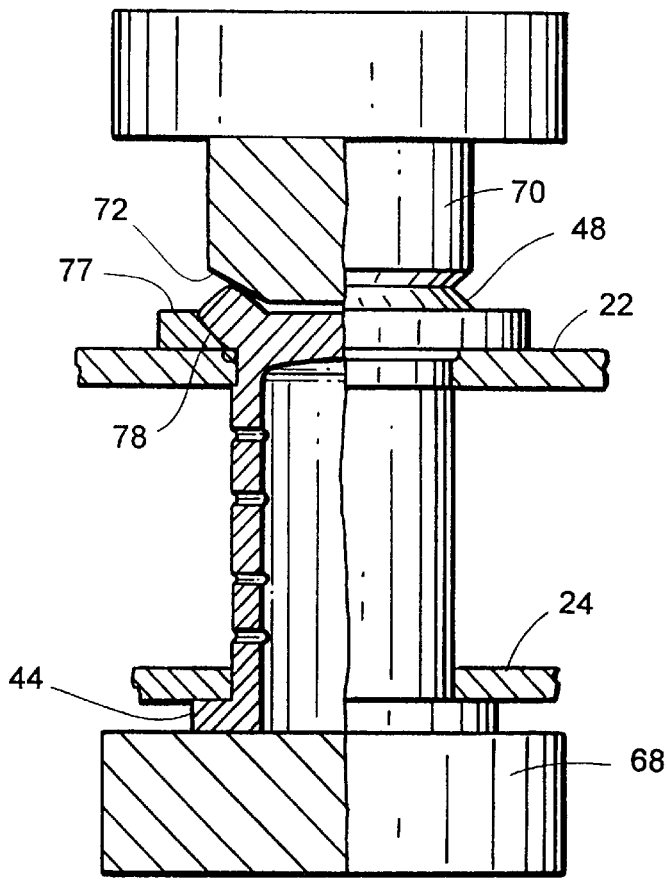
FIGS. 5A–B are partial cross-sectional views of an igniter post illustrating additional steps in the assembly of a gas generator in accordance with the present invention.
Figure 5B:
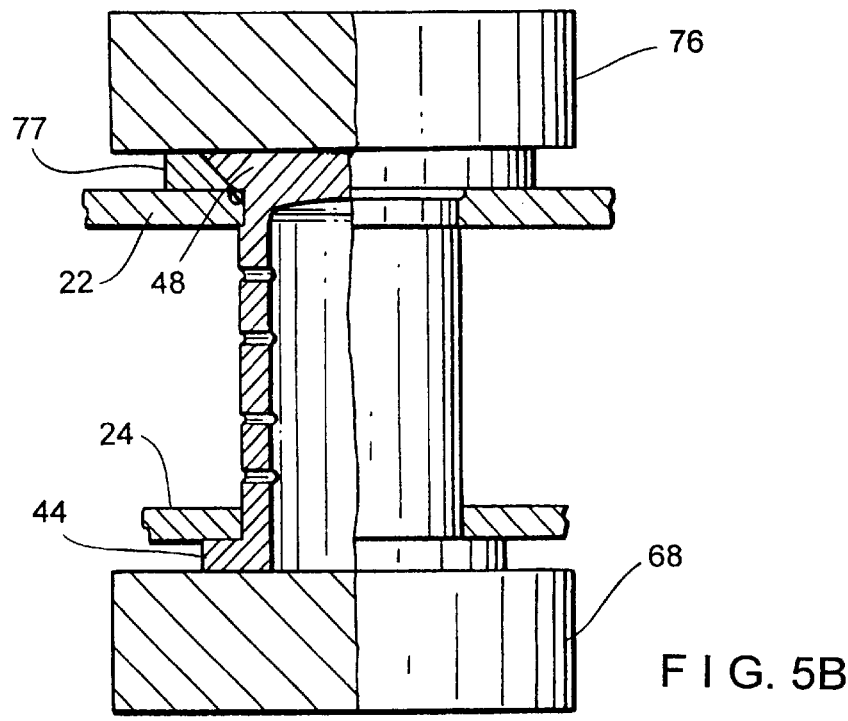

In an alternative embodiment of the invention shown in FIGS. 5A and 5B, a washer 77, preferably made of steel, is placed around rim the 48 prior to engagement with the die. The die 70 with conical surface 72 is then pressed against the rim 48 so that the rim engages a beveled interior surface 78 of the washer 77. The second die 76 may then optionally be used to press the rim 48 flat against the washer 77. Using the washer 77 reinforces the joint between the post and the second side, by distributing the pressure exerted by combustion over a larger surface area.

Figure 6:
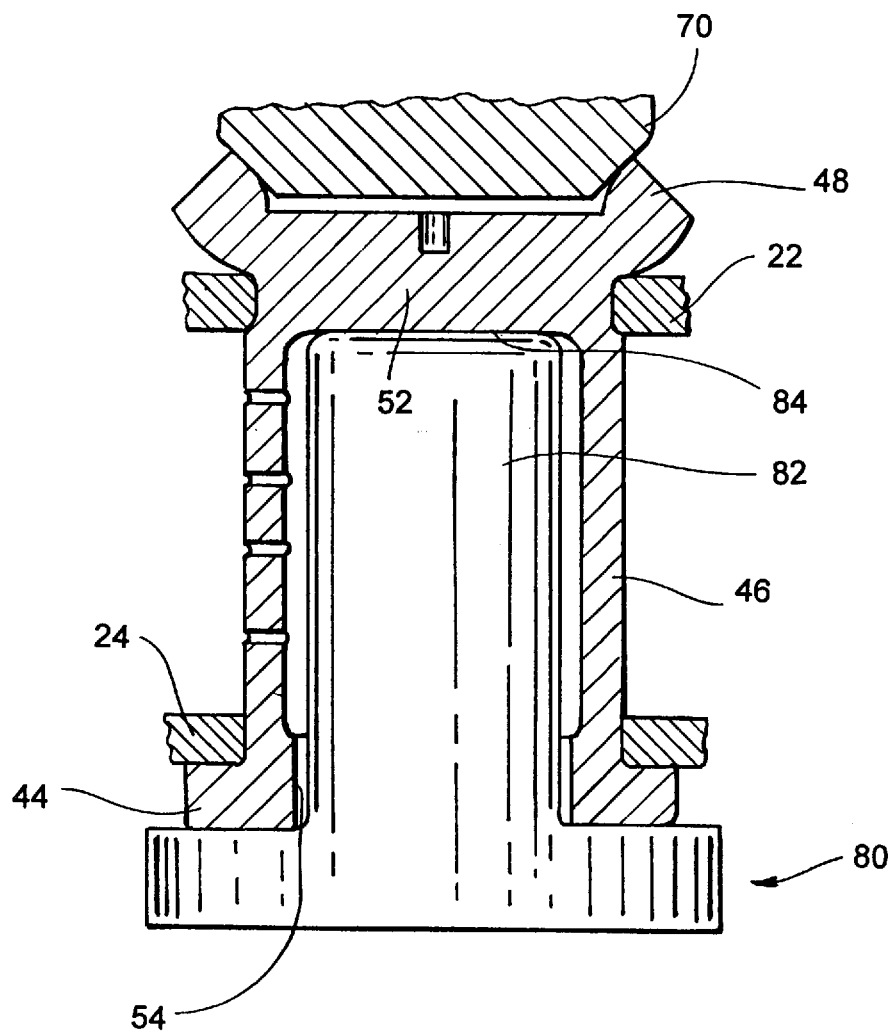
FIG. 6 is a partial cross-sectional views of an igniter post illustrating the use of a mandrel in accordance with the present invention.

Referring to FIG. 6, a mandrel 80 can replace the stationary base used during the die forming process to prevent distortion of the post wall during forming. The mandrel 80 has a projection 82 which extends through the opening 54 into the tubular body 46. A head 84 contacts the transverse wall 52. As die 70 presses against the rim 48, the wall 52 is braced against the head 84. Thus, the forming pressure is limited to acting on side 22.

Hydraulic testing has confirmed that the igniter post produced in accordance with the present invention acts successfully as a structural tie, with the cold formed head able to withstand axial loads comparable to those encountered during generator operation. Consequently, the invention provides a unique method for incorporating an igniter post in a gas generating device without threaded connection or using welding, thus avoiding the potential for ignition. Weight and space are also conserved by the absence of threaded connections. Assembly in accordance with the present invention can also be highly automated to increase production.

Although the invention has been described in relation to particular embodiments and applications, one of ordinary skill in the art, in light of this teaching, can generate additional embodiments and modifications without departing from the spirit or scope of the invention. Accordingly, it is to be understood that the drawings and descriptions herein are proffered by way of example to facilitate comprehension of the invention and should not be construed to limit the scope thereof.

What we claim is:

1. A method of assembling a gas generator without welded joints comprising the steps of:
   providing a combustion chamber having a first wall and a second wall on opposite sides thereof, said first wall having a first opening and said second wall having a second opening, the openings being coaxially aligned;
   providing an igniter post having a hollow tubular body, a head at one end of said body, a transverse wall extending across said tubular body at an opposite end of said body, and a rim at said opposite end of said body, said body being insertable in said first opening, said head being larger than said first opening and said rim having a diameter approximating the diameter of the second opening;
   inserting said body through said first opening until the head abuts the first wall, and said rim extends through said second opening to the exterior of said combustion chamber;
   pressing said rim outwardly such that it extends over the second wall adjacent the second opening, the rim forming a second head to lock the igniter post between the openings.

2. The method of claim 1, further comprising partially inserting the body through the first opening such that the rim is within the combustion chamber and introducing pyrotechnic pellets through said second opening into said combustion chamber.

3. The method of claim 1, further comprising attaching a cap to said rim prior to inserting the body into the first opening, and removing said cap prior to pressing the rim outwardly.

4. The method of claim 1 further comprising providing a die having a conical surface for pressing said rim outwardly.

5. The method of claim 1 further comprising providing a passage in the head of the tubular body and inserting a mandrel through the passage into said body prior to pressing the rim outwardly.

6. The method of claim 1, further comprising placing a washer having a beveled interior surface around said rim prior to pressing the rim outwardly.

7. A non welded gas generator consisting essentially of:
- a casing having a combustion chamber therein, said casing having a first side with a first opening and a second side with a second opening;
- an igniter post traversing said casing from said first opening to said second opening, said igniter post having a substantially tubular body, said body having a plurality of holes extending from a hollow interior of said body to said combustion chamber;
- a head on a first end of said igniter post, said head engaging said first side of said casing;
- a transverse wall extending across said tubular body at a second end of said body opposite said first end;
- a ductile rim on said second end of said body, said ductile rim being bent outwardly to engage said second side of said casing.

8. The gas generator of claim 7 wherein said head has a squib opening therethrough communicating with said interior of said body.

9. The gas generator of claim 8, further comprising a squib mounted in said opening.

10. The gas generator of claim 7, further comprising an igniter bag mounted in said hollow interior of said body and pyrotechnic pellets disposed in said combustion chamber.

11. The gas generator of claim 7 wherein said transverse wall has a squib opening therethrough communicating with said hollow interior of said body.

12. The gas generator of claim 11 further comprising a squib mounted in said squib opening.

13. The gas generator of claim 7, further comprising seal means disposed adjacent the head and rim to limit gas passage therethrough.

14. The gas generator of claim 7, further comprising a washer having a beveled interior surface disposed about the rim adjacent the second opening, the rim bent outwardly to engage the washer.

* * * * *